Figure 1:
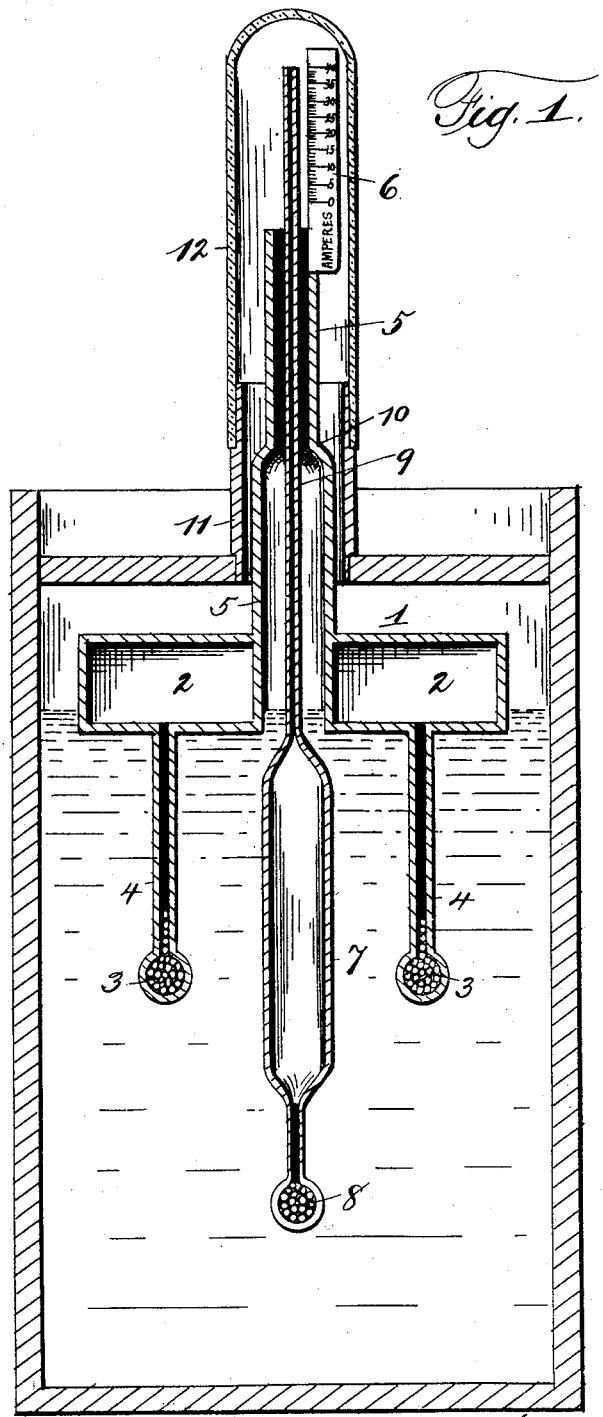

(No Model.)  T. A. WILLARD.  2 Sheets—Sheet 1.
HYDROMETER.

No. 533,153. Patented Jan. 29, 1895.

(No Model.) T. A. WILLARD. 2 Sheets—Sheet 2.
HYDROMETER.

No. 533,153. Patented Jan. 29, 1895.

Witnesses:
Wm. E. Poulter
J. A. Willson

Inventor:
Theadore A. Willard.
by H. A. Willson, Attorney.

UNITED STATES PATENT OFFICE.

THEADORE A. WILLARD, OF NORWALK, OHIO.

HYDROMETER.

SPECIFICATION forming part of Letters Patent No. 533,153, dated January 29, 1895.

Application filed December 28, 1893. Serial No. 494,993. (No model.)

*To all whom it may concern:*

Be it known that I, THEADORE A. WILLARD, a citizen of the United States, residing at Norwalk, in the county of Huron and State of Ohio, have invented certain new and useful Improvements in Gages; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has relation to a device for determining the ampère-hours contained in a storage cell or accumulator by changes in the density of the electrolyte, and my invention has for its object to provide an extremely simple, inexpensive and efficient meter or gage whereby the amount of electric energy contained in the electrolyte of a battery cell may be readily and precisely determined at all times and with the above and other objects in view.

My invention consists in the novel construction, arrangement and combination of parts, as hereinafter fully described, illustrated in the drawings and pointed out in the appended claims.

Figure 2:
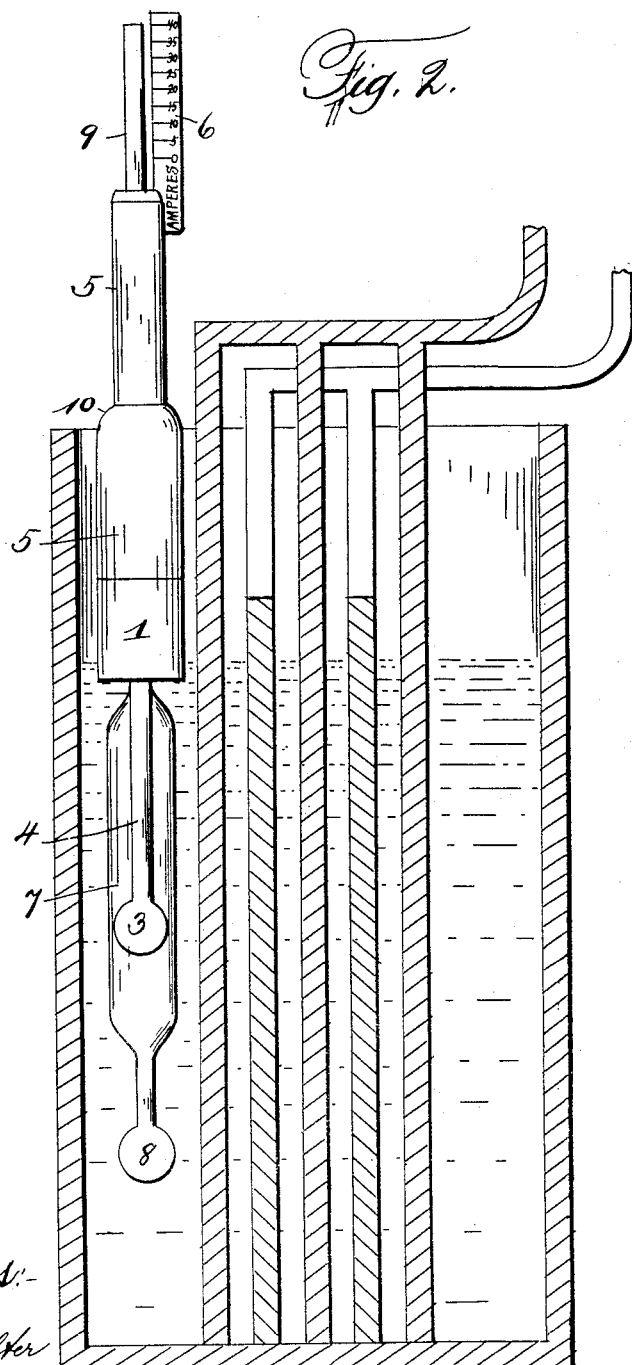

In the drawings:—Figure 1 is a vertical sectional view of my improved meter or gage applied to a closed battery cell. Fig. 2 is a vertical sectional elevation of my device applied to an open cell.

My improved meter or gage is adapted to indicate in ampères or otherwise the amount of electric energy contained in the electrolyte of a storage battery cell, its strength being thereby determined accurately, and my said device which I term an ampère meter or gage is adapted to be used either with a closed cell, that is, a cell provided with a cover, or with an open cell, as shown in Figs. 1 and 2 respectively.

In carrying out my invention, I provide any suitably constructed buoyant body, as for instance the float 1, which consists of the sections 2, 2, each of which is constructed of some material not affected by the electrolyte, as for instance hard rubber, said sections or floats being here shown as rectangular and hollow whereby they will be adapted to float upon the surface or very near the surface of the electrolyte. The floats are maintained in an upright position by means of weights depending therefrom, and in the drawings I show each of the floats as being provided with the vertically depending tubular arms 4, within which is contained any heavy substance or material 3, that will serve to maintain the floats upright.

Formed integral with the floats as shown, or attached thereto is a vertical tubular upright or stem 5, which in practice is adapted to extend upwardly above the cover of the cell (when the meter is applied to closed cells), and said stem or tube 5 is provided at its upper end with a scale-plate 6 on which are marked previously determined graduations indicating ampères for instance, the graduations beginning with zero at the lowest point of the scale and increasing toward the upper part of the scale-plate, as shown.

7 indicates an ordinary hydrometer which is adapted to be maintained in a vertical position by means of the weight 8 at its lower end, and the tube or stem 9 of said hydrometer extends upwardly within the tube 5, and is loose therein so as to be adapted to have an independent rising and falling movement within said tube. The tube 9 is made sufficiently long to adapt it to indicate on the the scale plate the various degrees of strength of the electrolyte beginning at zero and running to the highest graduation on said plate.

For the purpose of preventing any contact between the stem of the hydrometer and the interior wall of the tube 5, at any point below the surface of the electrolyte which might cause capillary attraction I expand the lower part of the tube 5 from the point 10 to the lower end thereof, so that the tube or stem of the hydrometer cannot come in contact with the tube 5 below the point 10 whereby any capillary attraction between said parts is prevented.

The tube 5, scale-plate and hydrometer should of course be constructed of some material or materials which will not be affected deleteriously by the electrolyte, as hard rubber or the like.

The floats 2, 2, are not intended to be affected by any variations in the density of the electrolyte but the hydrometer on the contrary should be extremely sensitive and be affected by the slightest variation in the density of said electrolyte. Now, we will suppose that the battery is empty or very nearly so, the specific gravity of the electrolyte contained within the cell being low owing to the loss of the acid constituent during the working of the battery and therefore the hydrometer will be down in the solution far enough to register zero on the scale plate. Now if the battery be charged the specific gravity of the electrolyte will become greater and in consequence the hydrometer will rise and if the scale is calibrated in ampère-hours, the device will indicate exactly the ampère-hours contained in a cell at a given temperature.

If desired, when the meter or gage is used with cells having covers as shown in Fig. 1, I may provide a short tube 11 secured to the cover and over which tube may be fitted a glass dome or cover 12 inclosing the upper ends of the stems of the floats and hydrometer, and the scale plate. Such provision is however dispensed with when the meter is used with cells unprovided with covers, as shown in Fig. 2.

What I claim, and desire to secure by Letters Patent, is—

1. In a meter or gage of the class described, the combination with a buoyant body provided with a scale-plate, of a hydrometer adapted to indicate on said scale-plate variations in the density of the electrolyte, as and for the purpose specified.

2. In a meter or gage of the class described, the combination with a buoyant body, and a tube carried thereby and having a scale plate, of a hydrometer having its stem arranged and adapted to have a rising and falling movement within the said tube and indicate upon the scale-plate variations in the density of the electrolyte, as and for the purpose specified.

3. In a meter or gage of the class described, the combination with a buoyant body made in sections as described, and a tube connected with said sections, and provided with a scale-plate, of a hydrometer having its stem arranged and adapted to have a rising and falling movement within the said tube, as and for the purpose specified.

4. In a meter or gage of the class described, the combination with a buoyant body, and a tube carried thereby, said tube being expanded toward its lower end, of a hydrometer having its stem arranged and adapted to have a rising and falling movement within said tube, as and for the purpose specified.

5. In a meter or gage of the class described, the combination with a buoyant body, weights depending from said body, and a tube carried by the latter and provided with a scale-plate, of a hydrometer having its stem arranged and adapted to have a rising and falling movement within said tube for the purpose specified.

In testimony whereof I affix my signature in presence of two witnesses.

THEADORE A. WILLARD.

Witnesses:
WM. H. HUSTED,
M. F. BRAGDON.